United States Patent [19]

Zinkan et al.

[11] Patent Number: 4,746,543

[45] Date of Patent: May 24, 1988

[54] COMPOSITION AND METHOD FOR DUST CONTROL

[75] Inventors: K. James Zinkan, Chagrin Falls; Louis J. Koenig, Jr., Parma, both of Ohio

[73] Assignee: Zinkan Enterprises, Inc., Cleveland, Ohio

[21] Appl. No.: 85,808

[22] Filed: Aug. 17, 1987

Related U.S. Application Data

[62] Division of Ser. No. 807,174, Dec. 10, 1985.

[51] Int. Cl.$^4$ .......................... B05C 1/16; B05D 7/00; C08K 5/06
[52] U.S. Cl. .................................... 427/136; 427/212; 427/221; 524/377; 524/502
[58] Field of Search ................ 524/377, 502; 427/221, 427/136, 212

[56] References Cited

U.S. PATENT DOCUMENTS

| | | | |
|---|---|---|---|
| 3,839,500 | 10/1974 | Dexter | 524/377 |
| 4,176,107 | 11/1979 | Buckman et al. | 524/377 X |
| 4,594,268 | 6/1986 | Kirwin | 427/221 X |

Primary Examiner—Michael R. Lusignan
Attorney, Agent, or Firm—Pearne, Gordon, McCoy & Granger

[57] ABSTRACT

This invention relates to a combination of anionic and non-ionic polymers and surfactants useful for the control of dust emissions into the environment. More specifically, the invention relates to novel compositions and the use of said compositions in treating particulate matter which comprises an aqueous solution of water soluble polymers comprising a unique mixture of water soluble acrylic polymers in combination with water soluble non-ionic glycol polymers in an aqueous medium containing effective amounts of anionic surfactants such as sulfonates and nonionic cosurfactants.

8 Claims, No Drawings

COMPOSITION AND METHOD FOR DUST CONTROL

This is a division of application Ser. No. 807,174, filed Dec. 10, 1985.

BACKGROUND OF THE INVENTION

This invention is directed to a composition and the method of using said composition in preventing the dissemination of particles of dust into the environment, and more particularly for the treatment of particles of dust which are hazardous to the individuals health and safety and the environment.

The presence of particulate matter or dust is a serious hazard with respect to the environment, and in general to the personal health and safety of individuals living in the vicinities of industrial operations such as the iron, coal and steel industries. Dust particles are known to contaminate food and water and when inhaled result in serious respiratory ailments. Industrial sources which are primarily responsible for many of the dust problems include the mining, coal, chemical and steel industries and the burning of waste, etc., which generate smoke, dust, ash and other particulate matter. The iron and steel industries, for example, utilize open hearth furnaces which generate dust particles generally collected by electrostatic precipitators to control the emissions. These electrostatic precipitators typically collect the dust particles in hoppers which are periodically dumped into containers thereby creating emissions during the transfer of the material. Moreover, in removing the particulate matter from the containers there generally are severe dust problems in that the particles are dumped in land fills, etc., where winds create dust clouds contaminating the entire area.

Another source of dust or ash is where incinerators or boilers are utilized to burn or incinerate waste such as garbage in place of ordinary fuels, i.e. coal, oil or gas. The incineration of waste generates dust or ash of various compositions due to the source of the waste material. For example, dust generated by incinerating garbage, and the like, is significantly finer than dust derived from other fuels which can be characterized as being very light, e.g. similar to talc powder in density, and, therefore, difficult to treat with most water systems. Various methods have been used to control this type of ash, e.g. spraying with wetting agents, but because of the fineness or density of the particles, the dust was difficult to collect and transport prior to treatment. Many of the problems associated with fine dust particles were overcome, however, by using a unique combination of wetting agents together with a certain mixture of polymers which react with the particles to form larger agglomerates capable of being collected by conventional methods.

There are presently available various mechanical and chemical methods for preventing particulate matter from becoming air-borne, i.e. electrical precipitators, etc., and various systems of hoods may be installed on the furnaces where the harmful dust particles are filtered. These mechanical systems alone, however, are cumbersome and expensive and are not completely adequate for present day standards. Similarly, the chemical systems used for controlling dust are limited to utilizing aqueous compositions to prevent the particles of dust from becoming air-borne.

To avoid the many problems encountered in dust abatement and to provide a better means for minimizing the amount of dust escaping into the environment, it has been found that the aqueous polymeric compositions of this invention may be utilized to suppress or control and in some instances eliminate the emission of particulate matter into the environment. The aqueous polymeric composition of this invention comprise a unique combination of nonionic and anionic water soluble polymers together with a mixture of nonionic and anionic surfactants in an aqueous system to treat and control dust emissions.

Accordingly, it is an object of this invention to provide a water soluble polymeric solution for the treatment and control of dust emissions. It is another object of this invention to provide a method of treating particulate matter with an aqueous polymeric composition for purposes of controlling the formation of dust. These and other objects of the invention will become apparent from a further more detailed description as follows.

DETAILED DESCRIPTION

It has been found that dust control may be accomplished by treating the particles of dust with an aqueous solution of a mixture of water soluble polymers comprising from about 1.0 to 99 parts by weight of water, 0.001 to 10 parts by weight of at least one water soluble acrylic anionic polymer having an average molecular weight ranging from about 1,000 to 20,000,000, about 0.005 to 20 parts by weight of a water soluble nonionic polymer, about 1 to 35 parts by weight of at lease one water soluble nonionic surfactant and 0.5 to 25 parts by weight of at least one water soluble anionic surfactant selected from the group consisting of sulfonates, sulfates, and succinates.

The water soluble acrylic anionic polymers useful for purposes of this invention, are used in amounts ranging from about 0.001 to 10 parts by weight and preferably in amounts ranging from about 0.01 to 1.0 parts by weight of the composition. The polymers include the acrylic polymers characterized as being derived from monomers having the formula

wherein R is selected from the group consisting of nitrile, amide, and carboxyl radicals including the polymers of acrylic or methacrylic acid and the various derivatives thereof such as the alkali metal and ammonium salts of acrylic and methacrylic acid.

Specifically, other acrylic polymers include polymers of acrylamide, methacrylamide, N-alkyl-substituted acrylamides, amino alkylamides, amino-alkylacrylates, alkyl-substituted aminoalkyl esters of acrylic and methacrylic acids, etc. In addition, the acrylic polymers include both the homopolymers and copolymers such as copolymers derived from olefinic monomers, i.e. ethylene, propylene, etc., and various other olefinic monomers such as styrene which are copolymerizable with the acrylic monomers. The hydrophilic polymers, useful for purposes of this invention, are known in the art and may be obtained by direct polymerization or copolymerization of one or more of the various monomers. Further, the acrylic polymers can be obtained by subsequent reaction such as, for example, the polymers which contain the nitrile group may be hydrolyzed forming the water soluble amides.

Similarly, acrylic copolymers of maleic anhydride and vinylacetate may be hydrolyzed to form water soluble polymers. The various homopolymers and copolymers which may be utilized for purposes of this invention are referred to herein as acrylic polymers and include the ethylenic polymers having a number of side chains distributed along substantially linear continuous carbon molecules. The side chains may be hydrocarbon groups, carboxylic acid groups and the various derivatives thereof including sulfonic acid groups, phosphoric acid groups, alkoxy groups and other functional groups. The number of side chains and the relative proportions thereof will depend on the kind of hydrophilic and hydrophobic groups required to provide water soluble polymers.

Specifically, the various polymers and the water soluble derivatives thereof useful for purposes of this invention include the hydrolyzed polyacrylonitriles, polyacrylamides, sulfonated polystyrene acrylamide-acrylic acid copolymers, polyacrylic acid, the salts of polyacrylic acid, the acrylamide-acrylonitrile copolymers, hydrolyzed methacrylic acid-acrylonitrile copolymers, polyethylacrylate maleic anhydride copolymers, hydrolyzed acrylonitrile-vinyl acetate copolymers, hydrolyzed acrylonitrile methacrylic acid copolymers, and the like the average molecular weight of these water soluble anionic polymers may range from as low as 1,000 to as high as 20,000,000. Generally, the preferred polymers have molecular weights as low as 10,000 and as high as 2 million.

In addition to the water soluble acrylic anionic polymers, it was found essential to incorporate in the aqueous solution an effective amount ranging from about 0.005 to 20 parts by weight of a water soluble nonionic polymer characterized as low melting polyalkylene glycols. These glycol polymers are terminated with methoxy groups at one end of the polymer chain and hydroxy groups at the opposite end of the chain or alternatively with hydroxy groups at both ends of the polymer chain. The molecular weight of these glycol polymers range from as low as about 200 up to about 15,000 with melting points ranging from about 15° to 70° C. The commercial polyethylene glycols are available from Union Carbide Corporation under the trademark CARBOWAX. The low melting polyethylene glycols include the glycols 200, 300, 400, 600, etc., with the higher molecular weight glycols being identified as polyethylene glycol 5,000 and higher.

To improve the wetting characteristic of the aqueous polymeric solution with respect to the particles of dust, it was found necessary to incorporate in the solution of polymers anywhere from 1.0 to 35 parts by weight of a water soluble nonionic surfactant. The most preferred nonionic surfactants for purposes of this invention are the alkylphenyl polyethoxy alcohols. A general class of nonionic surfactants or wetting agents are the alkylphenyl polyalkoxy alcohols represented by the formula R-phenyl-O $(C_2H_4O)nH$, wherein R represents CH— and n has the value ranging from 4 to 12. Various polyalkoxy alcohol surfactants are available commercially under the trademarks IGEPAL and TRITON. Other nonionic surfactants include the alkoxylated alcohols available commercially as PLURAFAC and ICONOL.

In addition to the polyalkoxy alcohols, other alkoxylated nonionic surfactants that may be used for purposes of this invention include the nonionic surfactants which have the proper hydrophilic-lipophilic balance. These surfactants can be used with the alkoxylated nonionic alcohols as cosurfactants to provide combinations having the required hydrophilic-lipophilic balance which provides the necessary wetting characteristics for the polymeric solution. These alkoxylated nonionic surfactants are commercially available as both long chain and short chain surfactants which are prepared from the hydroxylated hydrocarbonyl compounds such as the branched and straight chained alcohols and alkylphenols. Some of these nonionic surfactants are available under the commercial name TERGITOL which are the condensation products of alkylene oxides and monohydric alcohols. Typical nonionic surfactants can be prepared, for example, in the manner disclosed in U.S. Pat. Nos. 2,164,431 and 3,650,965.

Other nonionic surfactants include the condensation products of higher fatty alcohols with one or more alkylene oxide such as ethylene or propylene oxide or the lower alkyl ethers of an alkyl phenoxyalkoxy lower alcohol. These nonionic surfactants are condensation products of a higher fatty alcohol with one or more alkylene oxides wherein the fatty alcohol has up to 20 carbon atoms and the alkylene oxide ranges from 60 to 80% of the condensation product.

In addition to the nonionic surfactant, it was found that the wetting characteristics of the polymeric solution can be substantially improved by using in combination with the nonionic surfactant effective amounts ranging from 0.5 to 25 parts by weight of the aqueous solution of at least one anionic surfactant selected from the group consisting of sulfonates, sulfates, and succinates. The particularly preferred anionic surfactants include the water soluble linear alkyl substituted aromatic sulfonates containing up to 8 carbon atoms in the alkyl group and particularly the alkali metal and amine salts. Other useful water soluble anionic surfactants include the various metal and amine salts of the higher alkylaryl sulfonic acids such as the alkyl benzene sulfonates. These sulfonates are know in the art and are described in the text *Surface Active Agents and Detergents,* Vol. II, by Schwartz and Perry, Interscience Publishers Inc. (1958). In addition to the sulfonic acid salts, other water soluble anionic surfactants include the alkyl sulfates such as the higher alkyl sulfates, i.e. the higher fatty acid glyceride sulfates. Examples of sulfates include the higher alcohols such as sodium lauryl sulfate, sodium tallow sulfate, and the sulfates of the mono and diglycerides of fatty acids. In addition to the sulfonates and sulfates, the succinates include the dialkyl sulfosuccinates such as sodium dihexyl sulfosuccinate, sodium diisobutyl 3-methylbutyl sulfosuccinate, or sodium dimethyl 4-ethylhexyl sulfosuccinate which may be utilized alone or in combination with the other anionic surfactants.

In addition to the unique combination of the anionic and nonionic polymers, i.e. mixtures of acrylic polymers and polyalkylene glycol polymers in combination with mixtures of the nonionic and anionic surfactants, the dust control composition of this invention may include other known additives. For example, the composition may contain from 0 to 10 parts by weight of the total polymeric composition of at least one sequestering or chelating agent. These compounds are generally known and include the alkali metal salts of phosphoric acid, such as tetrasodium pyrophosphate the salts of citric and gluconic acid such as potassium gluconate or potassium citrate and preferably the alkali metal salts of ethylenepolyamine polyacetic acid, e.g. EDTA, HEDTA, DTPA, or the sodium salt of ethylenediamine tetraacetic acid. Other chelating agents available commercially are known as TRILON including the salts of ethylenepolyamine polyacetic acid.

While the alkalinity or pH of the aqueous polymeric solutions is not critical, it is preferred to use, for the control of dust, aqueous solutions that are alkaline. The alkalinity can be maintained by the addition to the water systems sufficient amounts of an alkaline reagent such as caustic soda and the like to maintain the aqueous composition at a pH in excess of 7.0.

The following examples are illustrations of the compositions and the use of the aqueous compositions of this invention for purposes of dust control.

EXAMPLE I

| Components | Parts by Weight |
| --- | --- |
| Water | 1 to 99 |
| Acrylic Anionic Polymers | 0.001 to 10 |
| Nonionic Glycol Polymers | 0.005 to 20 |
| Water Soluble Nonionic Surfactants | 1 to 35 |
| Water Soluble Anionic Surfactants, e.g. sulfonates and sulfates | 0.5 to 25 |
| Chelating or Sequestering Agents | 0 to 10 |
| Alkaline Reagent, e.g. caustic soda | 0 to 5 |

EXAMPLE II

| Components | Parts by Weight |
| --- | --- |
| Water | 60 to 80 |
| Acrylic Anionic Polymers | 0.01 to 1.0 |
| Nonionionic Glycol Polymers | 0.05 to 10 |
| Water Soluble Nonionic Surfactants | 5 to 20 |
| Water Soluble Anionic Surfactants, e.g. sulfonates and succinates | 5 to 15 |
| Chelating or Sequestering Agents | 0.1 to 5 |
| Alkaline Reagent, e.g. caustic soda | pH over 7 |

EXAMPLE III

| Components | Parts by Weight |
| --- | --- |
| Caustic Soda | pH over 7.0 |
| Water | 73.00 |
| Polyacrylamide (mole. wt. of up to 10,000) | 0.10 |
| Polyethylene Glycol (mole. wt. about 600) | 0.50 |
| Dodecylbenzene Sulfonic Acid Salt | 9.00 |
| Nonylphenol Ethoxylate | 16.80 |
| EDTA (38%) | <1.00 |

The amount of the aqueous polymeric compositions utilized to control dust in accordance with this invention varies depending on the nature and source of the dust particles. For example, the highly porous, low density particles such as fly ash, slag or particles of extremely small diameter of less than one micron require relatively larger amounts of the composition for control. Whereas with larger particles in excess of ten microns and the denser nonporous particles, require smaller amounts of the polymeric composition. It was generally found that the treatment of dust particles for purposes of control ranges from about 0.1 to 20 and preferably from 0.25 to 5.0 parts by weight of the aqueous polymeric composition (Example III) for every 2,000 parts by weight of dust. The amount of treatment will depend, however, on the concentration of polymers in solution.

Precipitator dust obtained from a waste fired boiler, under microscopic examination, had particle sizes ranging from 1 to 50 microns with the bulk being in the range of 1 to 10 microns. After treating the dust with the composition of Example III, however, microscopic examination showed the particles ranging from 1 to 100 microns with some in the range of 1 to 2 microns. The smaller size particles, i.e. in the range of 3 to 10 microns, were reduced with a concurrent increase to sizes of 10 microns or greater. By treating the dust particles in accordance with this invention, the smaller particle sizes increased to particle sizes greater than 10 microns as illustrated by the folowing data:

| TREATMENT | WT. PER. UNIT VOL. |
| --- | --- |
| 1. Untreated Dust | 7671 mg./m$^3$ |
| 2. Commercial Product | 711 mg./m$^3$ |
| 3. Product of Example III | 106 mg./m$^3$ |

The method employed in treating the dust to control emissions may vary depending on the industrial sources of the fugitive dust. For example, the aqueous polymeric compositions of this invention may be utilized by spraying the particulate dust as it is discharged from an oxygen furnace. Here the dust particles may be collected by an electrostatic precipitator located at the top of the furnace. The dust particles collected by the precipitator are transferred into a silo from which it is carried away by trucks, cars, etc. The spray apparatus may be located between the silo and the cars, while the particulate matter is dumped through the aqueous spray. The spray apparatus is capable of supplying effective amounts of the polymeric solution to the particles of dust.

The aqueous polymeric materials of this invention are unique in that the composition is formulated primarily because of the electrical charge of the dust particles. By considering the charge on the particles, the particular combinations of anionic and nonionic polymers can be selected to react with the particles. In theory, the anions along the polymeric chain of the anionic polymers attract the smaller particles of dust forming larger particles which are more easily collected by mechanical means. The nonionic functional groups of the nonionic polymers attract the smaller particle sizes by hydrogen bonding or electrostatic attraction. Therefore, by using the right combination of anionic and nonionic polymers in accordance with this invention, both the charged and uncharged particles are attracted forming larger particles or agglomerates thereby making the treated dust particles more easily to collect by conventional mechanical methods. Moreover, since the electrical charge and the surface tension of the dust repel water it is important to neutralize the particles with a specific combination of surfactants, i.e. a combination of anionic and nonionic surfactants. This specific mixture of surfactants and water soluble polymers in an aqueous system can to used to control dust, e.g. in electrostatic precipitators, or in bottom ash systems generated by the various industries including steel mills, waste disposal, incinerators, utilities, chemical plants, mining and coal operations or the like.

In addition to industrial plants and mining operations, the burning of waste and garbage, for example, also generates dust or ash which requires the use of electrostatic precipitators or similar systems to control emissions. This form of dust is generally finer than dust produced by the burning of coal, etc., and although there have been a number of attempts to control the dust with sonic devices, spraying with wetting agents, etc., it was found that the aqueous polymeric composition of this invention could be used more effectively at lower costs. For example, the polymeric compositions may be used with conditioning boxes, i.e. mechanical devices that transfer the dust through a closed box unit where the dust particles are wetted. Subsequently, the dust from these conditioning boxes are loaded into pits and ultimately removed without complications. Where dust particles were not treated, the particles were generally acknowledged to create problems including damage to the electrical equipment, injuries to the health and safety of the workers, and a general nuisance to the environment.

While this invention has been described by a number of specific examples, it is obvious that there are other variations and modifications which can be used without departing from the scope of the invention as set forth in the appended claims.

The invention claimed is:

1. A method of controlling dust which comprises treating the dust particles near the point of generation with an effective amount of an aqueous solution of water-soluble polymers, which comprises:
   (a) about 1 to 99 parts by weight of water,
   (b) about 0.001 to 10 parts by weight of at least one water-soluble anionic acrylic polymer having an average molecular weight ranging up to about twenty million derived from a monomer selected from the group consisting of acrylamides, acrylonitriles, acrylic acid, methacrylic acid, and the salts and esters of acrylic and methacrylic acids,
   (c) about 0.005 to 20 parts by weight of a water-soluble nonioric alkylene glycol polymer having an average molecular weight ranging from about 200 to 15,000,
   (d) about 1.0 to 35 parts by weight of at least one water-soluble nonionic polyalkoxy alcohol surfactant having an average molecular weight ranging from about 200 to 15,000, and
   (e) about 0.5 to 25 parts by weight of at least one water-soluble anionic surfactant selected from the group consisting of sulfonates, sulfates, and succinates.

2. The method cf claim 1, further characterized in that the particles of dust are treated with the aqueous solution of polymers and surfactants in an amount ranging from about 0.25 to 5.0 parts by weight of the solution of polymers and surfactants per 2000 parts by weight of dust.

3. The method of claim 2, further characterized in that the aqueous solution of polymers and surfactants is alkaline and contains from 0 to 10 parts by weight of a sequestering agent.

4. The method cf claim 3, further characterized in that the sequestering agent is a salt of ethylenediamine tetraacetic acid.

5. The method of claim 1, further characterized in that at least one of the anionic acrylic polymers is a hydrolyzed polyacrylamide.

6. The method of claim 1, further characterized in that at least one of the anionic acrylic polymers is a polymethacrylic acid salt or ester.

7. The method of claim 1, further characterized in that the nonionic polyalkoxy alcohol surfactant is an alkylphenyl polyethoxy alcohol.

8. The method cf claim 1, further characterized in that at least one of the anionic surfactants is a sulfonate.

* * * * *